2 Sheets—Sheet 1.
O. A. EBERT.
Hot-Air Register.
No. 99,864.          Patented Feb. 15, 1870.
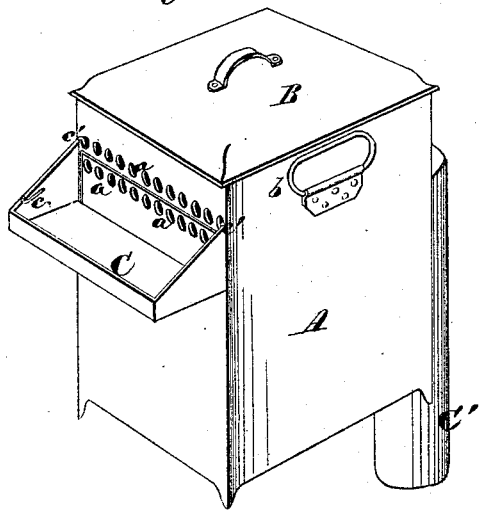
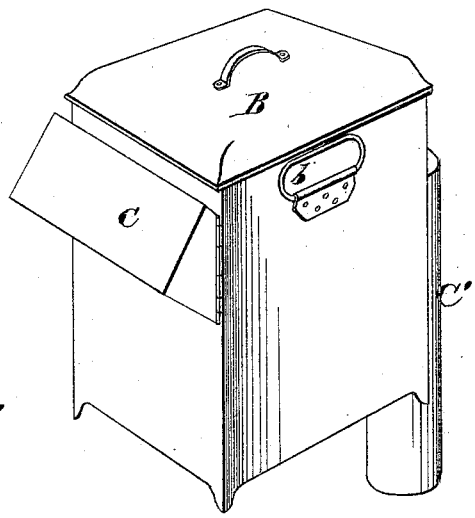
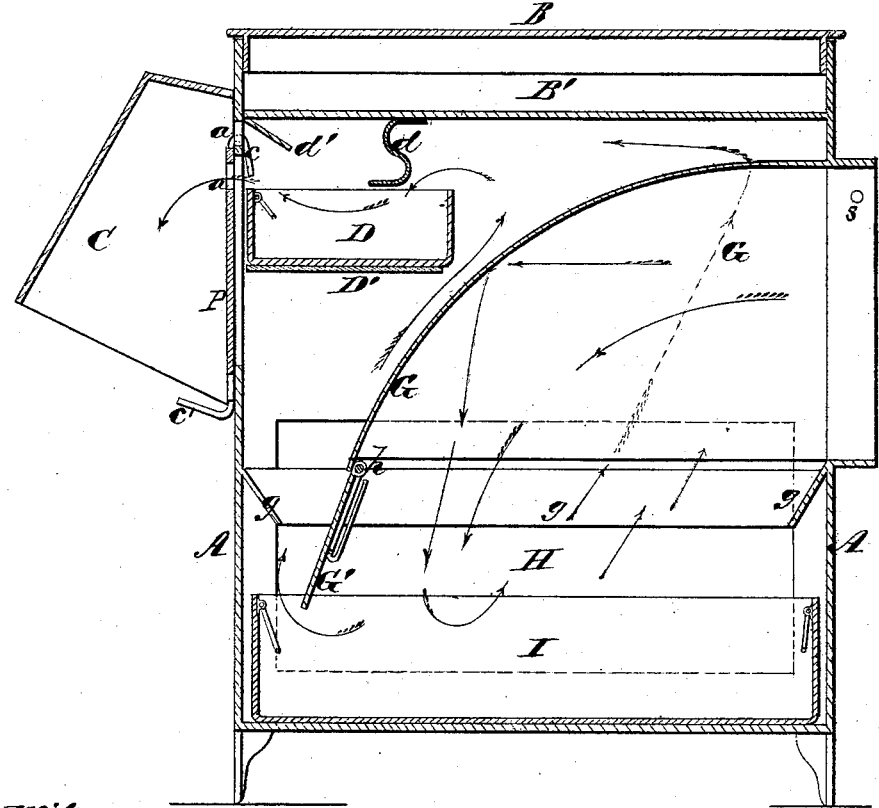
Witnesses
R. T. Campbell
J. N. Campbell
Inventor
O. A. Ebert
by
Mason, Fenwick & Lawrence O. A. EBERT.
Hot-Air Register.

No. 99,864.  Patented Feb. 15, 1870.

2 Sheets—Sheet 2.

Witnesses.  Inventor

UNITED STATES PATENT OFFICE.

OCTAVIUS A. EBERT, OF BALTIMORE, MARYLAND.

ATTACHMENT FOR HOT-AIR REGISTERS.

Specification forming part of Letters Patent No. 99,864, dated February 15, 1870.

*To all whom it may concern:*

Be it known that I, OCTAVIUS A. EBERT, of the city of Baltimore, in the State of Maryland, have invented a new and useful Attachment for Hot-Air Registers; and I do hereby declare that the following is a full, clear, and exact description thereof, reference being had to the accompanying drawings making part of this specification, in which—

Figure 1, plate 1, is a perspective view of the improved register attachment, showing the deflector arranged in front of the hot air exit apertures, so as to serve as a shelf for supporting articles to be warmed.

Figure 2, plate 1, is a similar view of the same parts, showing the deflector arranged so as to guard the hot-air exit holes, and to direct the escaping hot air downward.

Figure 3, plate 1, is a section through the apparatus taken in a vertical plane from front to rear.

Figure 4:
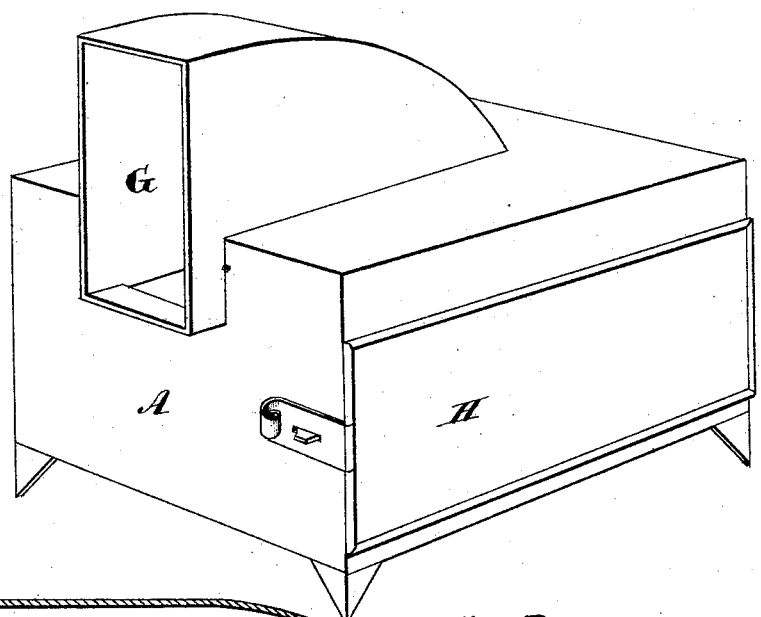

Figure 4, plate 2, is a perspective view of a modified form of the apparatus, with the upper chambers shown in fig. 3 removed.

Figure 5:
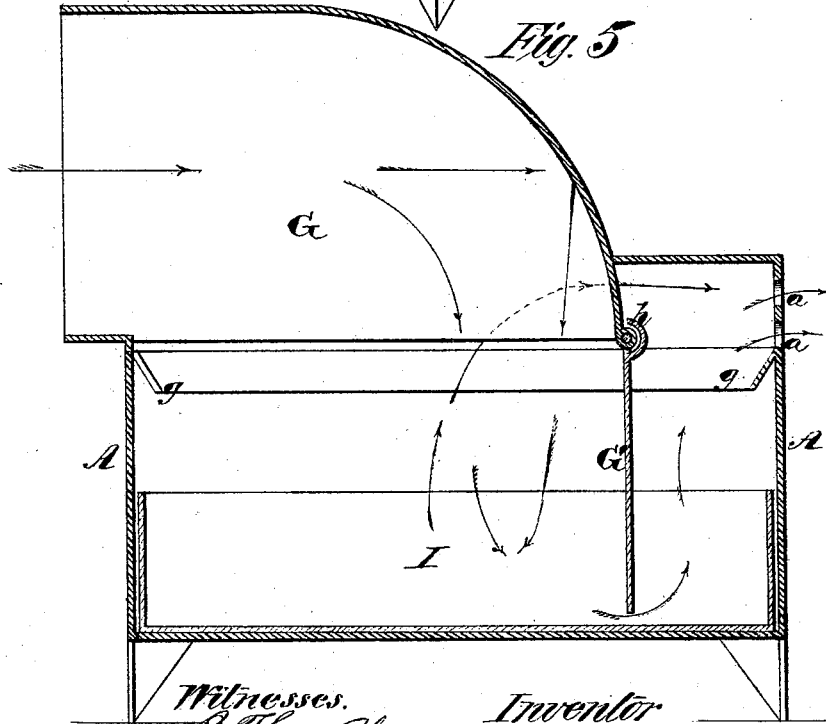

Figure 5, plate 2, is a sectional view of fig. 4.

Similar letters of reference indicate corresponding parts in the several figures.

It is a well-known fact that air which is heated by stoves and furnaces, and conducted into upper apartments for the purpose of warming them, is usually very dry, charged with dust, and otherwise unpleasant and unhealthy. My object is to moisten and purify this heated air before it escapes into the room to be warmed, by conducting the air through an apparatus which contains one or more vessels of water, and one or more dust-traps, as will be hereinafter explained.

To enable others skilled in the art to understand my invention, I will describe its construction and operation.

In the accompanying drawings, plate 1—

A represents a chest, which is preferably made of sheet metal, but which may be made of any other suitable material. This chest A may be made of a rectangular, cylindrical, or other form, and it may be finished so as to present a neat, ornamental appearance. Through one side of this chest A an opening is made of a size and shape of the register, through which the heated air is allowed to escape from a flue into the apartment.

This opening communicates with a bonnet, G, having vertical sides and a concavo-convex, or downwardly-curved top plate, as shown in fig. 3.

The bottom of this bonnet G is open, so that air entering the bonnet will be directed downwardly into a pan, I, which rests upon the bottom plate of the case A.

An extension of the curved deflecting plate of bonnet G may be made by hinging a plate, G', to its lower edge at $h$, and making this hinged plate wide enough to extend well down into the pan I.

The plate G' is hinged in order that the pan I may be removed for cleaning it, plate G' being turned up out of the way to allow the removal of the pan through a side door, H.

Directly above the pan I, and extending around the interior of the side walls of case A, are fixed inclined plates $g$ of suitable width to form traps for the dust rising with the warm air. These inclined ledges $g$ have the effect of temporarily arresting the ascending air and forming an eddy which allows the floating dust to fall into the pan beneath.

The air ascends to the upper portion of the chest A on its way to the escape apertures $a\ a$, but before reaching these apertures the air is caused to dive into a pan, D, of water which still further purifies the air. The curved plates $d$, and the inclined lip $d'$, operate as deflectors of the air and direct it downward upon the water in vessel D.

This vessel D can be removed from its shelf D' through an opening made through the front wall of case A, which opening is provided with a hinged door, P, shown in fig. 3.

By observing the course of the arrows in fig. 3, plate 1, it will be seen that the warm air enters the bonnet G, is by it directed downwardly upon the water in vessel I, which moistens and purifies the air. The air thence rises in eddies, and is again moistened and further purified by its passage over water in the vessel D, and finally escapes from the case A, through the apertures $a\ a$ near the upper end of the front wall of the case.

If desirable, an apartment, B', may be formed at the upper part of case A, provided with a removable cover, B, which apartment will be found useful for containing articles which it may be desired to keep warm.

The guard C is especially designed to prevent children from introducing articles through the apertures a a, and also to direct the outflowing air downwardly, for which purposes this guard is arranged as shown in figs. 2 and 3, plate 2, and supported by the hooks c, which are inserted through two of the holes a. A receptacle for vessels containing fluids to be warmed, may be formed by adjusting the device C, as shown in fig. 1, and supporting it by means of the hooks c' applied to two of the apertures a a.

In figs. 4 and 5, of plate 2, I have shown a modified form of the apparatus, which consists in omitting the chamber above the bonnet G, and conducting the heated air from the vessel I directly out through the apertures a a, as shown by the course of the arrows in fig. 5.

When the apparatus is constructed for application to a register placed in the side of a wall, an opening, s, shown in fig. 3 of plate 1, will be made through the external lip of the bonnet for the passage of a rod which will be attached to and adapted for use in the movements of the register plates.

Where the heated air is conducted into an apartment through the floor, as in halls and places of worship and entertainment, the same principle of construction will be adopted, but the apparatus will be adapted for use between the floor and ceiling below.

In the drawings, the arrows indicate the direction of the heated currents into and out of the apparatus. As these currents enter the bonnet under more or less pressure from below, it is obvious that they will strike the curved crown of the bonnet, and be directed downwardly upon the surface of the water in the pan below, thence rise through passages on opposite sides of the bonnet and pass to the exit apertures at the front of the case.

I have shown some of the arrows as indicating currents passing beneath the hinged extension of the bonnet, but the largest volume of air will rise on opposite sides of the bonnet to the top of the apparatus, as above stated.

Having described my invention,

What I claim as new, and desire to secure by Letters Patent, is—

1. The construction of the case A, with a bonnet G, a removable water pan I, and a dust-trap g, substantially as described.

2. The chamber B', constructed within the case A of a hot-air moistening and purifying device, substantially as described.

3. The guard C, removable from and adapted for use in conjunction with the moistening and purifying apparatus, substantially as described.

OCTAVIUS A. EBERT.

Witnesses:
CHAS. E. HUTCHISON,
E. H. BANTZ.